US005794477A

United States Patent [19]
Ven-Chung

[11] Patent Number: 5,794,477
[45] Date of Patent: Aug. 18, 1998

[54] ALTERNATIVE MONO-DIRECTION AND DUAL-DIRECTION TRANSMISSION APPARATUS

[76] Inventor: Chu Ven-Chung, 3F, No. 3, Lane 42, Yuhsi st., Yung-ho City, Taipei Hsien, Taiwan

[21] Appl. No.: 682,903

[22] Filed: Jul. 16, 1996

[51] Int. Cl.$^6$ ............................................. F16H 21/40
[52] U.S. Cl. ......................................... 74/33; 74/22 A
[58] Field of Search ................................. 74/22 A, 33

[56] References Cited

U.S. PATENT DOCUMENTS

| | | | |
|---|---|---|---|
| 1,557,126 | 10/1925 | Wilcox | 74/33 |
| 2,190,572 | 2/1940 | Schottenberg | 74/33 |
| 2,526,976 | 10/1950 | Smith | 74/22 A |
| 2,560,000 | 7/1951 | Sacchini | 74/33 X |

Primary Examiner—Allan D. Herrmann
Attorney, Agent, or Firm—W. Wayne Liauh

[57] ABSTRACT

A transmission apparatus capable of mono-direction and dual-direction power transmission. It includes a mono-direction gear engageable with the output gear, a transversely slidable platform and an alternate dual-rotation actuating assembly. The alternate dual-rotation assembly includes a link having a first end, which is pivotally affixed to a third gear via a pin spaced apart from a center axis of the third gear, and a second end which is slidable on the vertical side wall of the platform; and a roller held in a roller seat which is slidably contacted by a compression spring. The link further includes first and second sides, the first side of the link having a teeth rack which is engageable with the output gear and the second side of the link is in contact with the roller. When the platform is moved transversely in one direction, the mono-direction gear engages with the third gear thus allowing the driving gear to transmit force in only one direction to the output spindle via the reducing gear set and the third gear. On the other hand, when the platform is moved transversely in an opposite direction, the mono-direction gear is disengaged from the output gear, and the teeth rack is engaged with the output gear through the roller and the compression spring thus enabling the output spindle to rotate alternately in both clockwise and counter-clockwise directions through the rotation of the pin on the third gear driven by the reducing gear set and driving gear.

2 Claims, 3 Drawing Sheets ns5,794,477

ALTERNATIVE MONO-DIRECTION AND DUAL-DIRECTION TRANSMISSION APPARATUS

BACKGROUND OF THE INVENTION

This invention relates to an alternate mono-direction and dualdirection transmission apparatus and particularly to a transmission apparatus which has an output spindle with a selective mono-direction or dual-direction rotation capability.

Conventional decorative articles or toys (such as Christmas tree, doll, sculpture, etc.) or the component of a toy (such as the arms of a doll) sometimes have a motor installed therein to enable them to rotate for increasing their amusement effect and appealing. However the rotation is usually limited to one direction. It becomes boring and dull after a short time of use.

SUMMARY OF THE INVENTION

In view of the aforementioned disadvantage, it is therefore an object of this invention to provide an alternate mono-direction and dual-direction transmission apparatus which enables a decorative article or a toy to rotate either in one direction or in dual directions at user's choice, and thus can increase the appealing and amusement effect of the article or toy.

This invention contemplates to use an alternate dual rotation actuating means which includes a gear, a link with a teeth rack on one side, a roller, a roller-seat with a compression spring and an output spindle to perform an alternate dual-direction rotation function on the output spindle.

This invention also contemplates to install a mono-direction gear on the actuating means so that by moving the actuating means in the opposite directions, the mono-direction gear can either be engaged or disengaged with the output spindle, and thus enable the output spindle to make either mono-direction or duel-direction rotation.

It is another object of this invention to provide a reducing gear set which can reduce the rotation speed from the motor to the output spindle to a desired level.

Additional objects and advantages of the present invention are made apparent in the following description having reference to the accompanying drawings. The accompanying drawings are only to serve for reference and illustrative purpose, and do not intend to limit the scope of the present invention.

DETAILED DESCRIPTION

Figure 1:
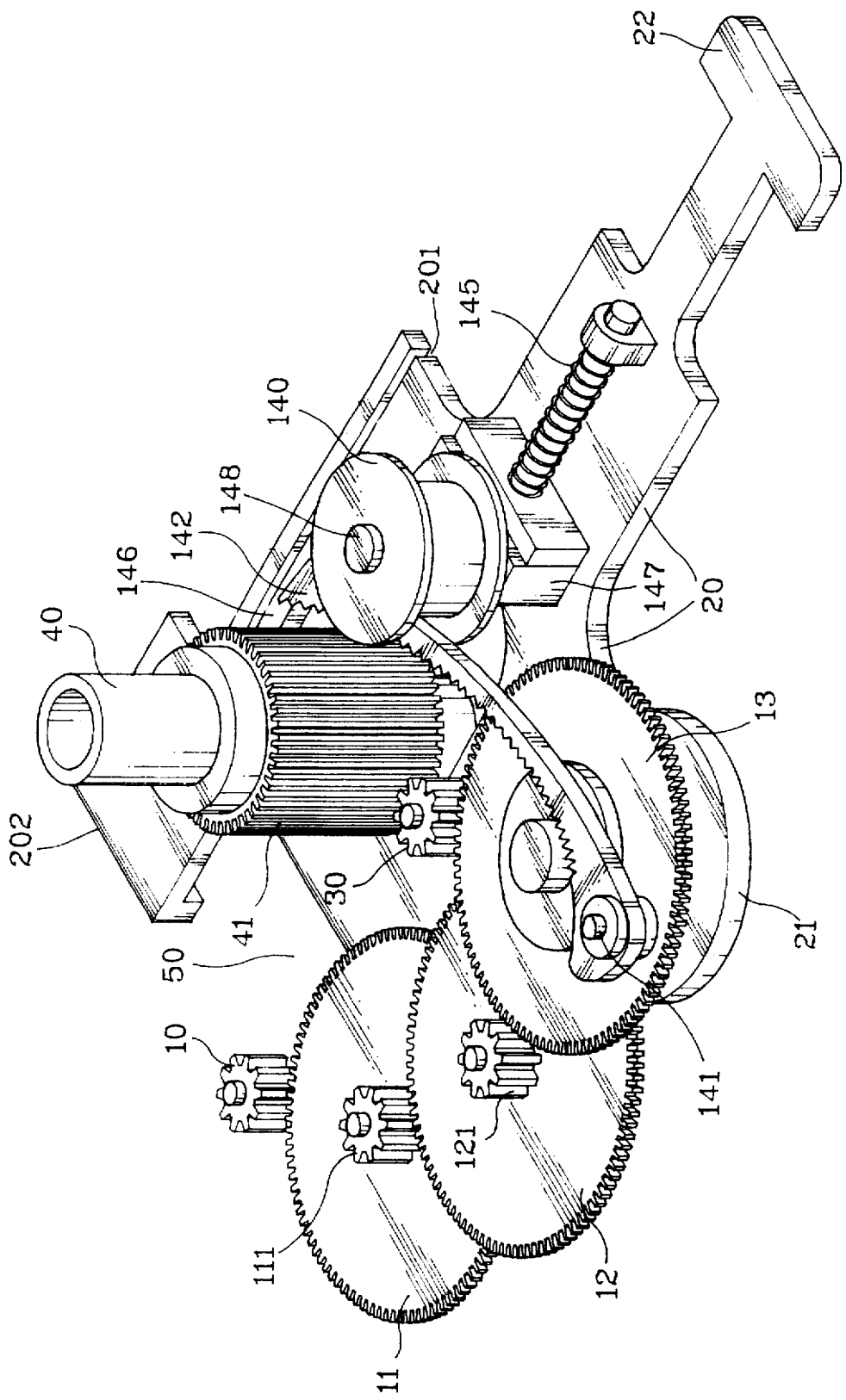
FIG. 1 is a perspective view of this invention.
Figure 2:
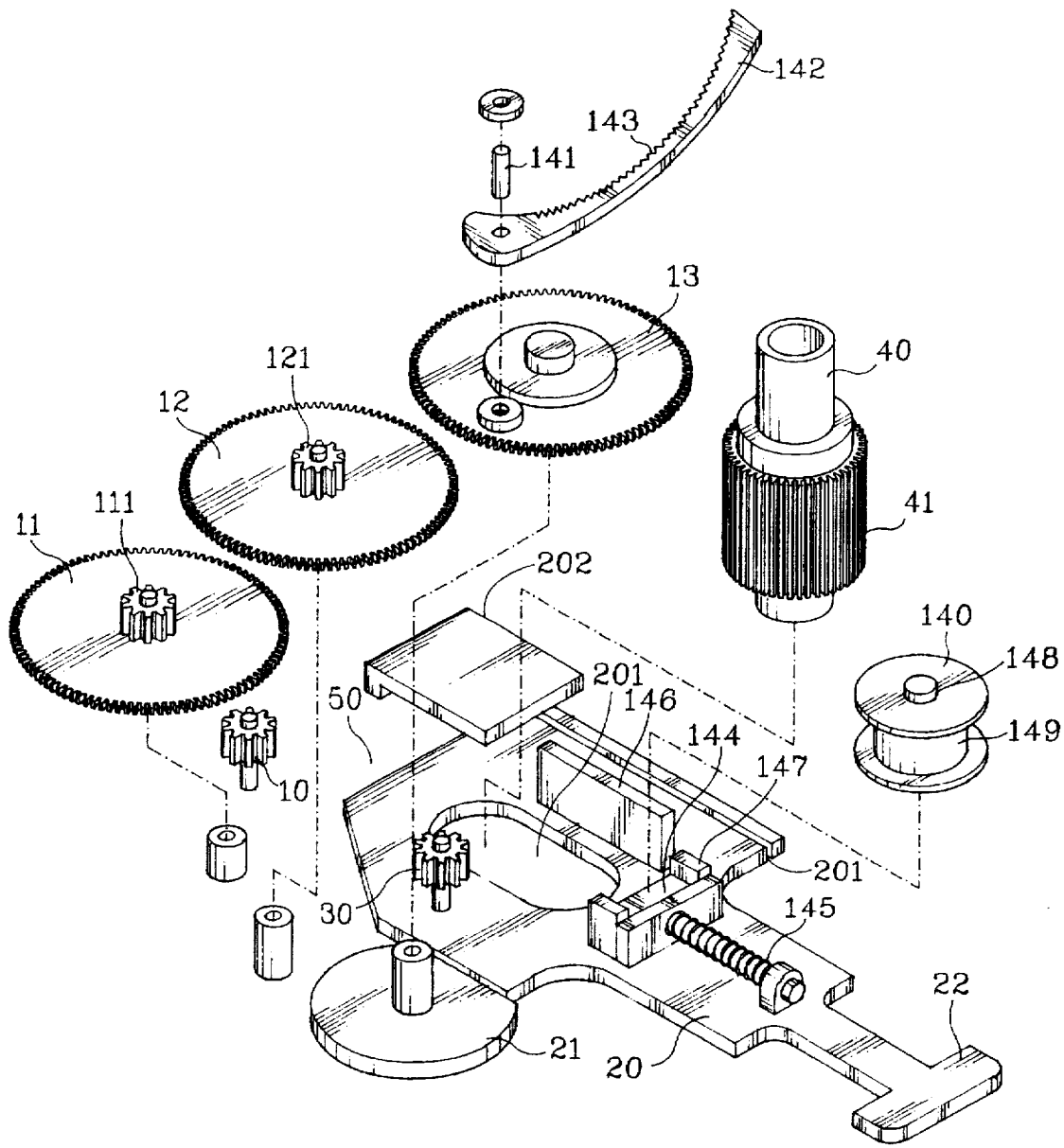
FIG. 2 is an exploded view of this invention.

Referring to FIGS. 1 through 3B, this invention includes a driving gear 10, a reducing gear set consisting of a first gear 11, a second gear 12, a first pinion 111 and second pinion 121, a platform 20, an output spindle 40 and an alternate dual-rotation actuating means. The platform 20 is transversely slidable within a limited distance via the slot 201 and the stop 202. The driving gear 10 is driven by a motor (no shown in the drawings). The driving gear 10 engages with the reducing gear set for reducing the rotation speed thereof to a desired level. The alternate dual-rotation actuating means includes a third gear 13 which is supported by a gear seat 21 which is in a traversely slidable position relative to platform 20. The third gear 13 also engages with the second pinion 121 and with a mono-direction gear 30 which is engageable with an output gear 41 located on the output spindle 40. On the third gear 13, there is a pin 141 spaced from the center axis and is pivotally holding one end of a link 142. One side of the link 142 is provided with a teeth rack 143. The teeth rack 143 is engageable with the output gear 41 through the push of a roller 140 which is held in a roller seat 144 which in turn is transversely slidable between a pair of roller grooves 147. The roller 140 is mounted about a shaft 147. There is a compression spring 145 for pushing the roller seat 144 and the roller 140 toward the link 142 thereby teeth rack 143 can be engaged with the output gear 41. There is also a side wall 146 vertically extended on the top of the platform 20 to enable the link 142 be rested and slided thereon. The platform further has an opening 201 to allow the output spindle 40 to pass through and a handle 22 to move the alternate dual rotation actuating means disposed thereon to the left or right direction transversely.

When the handle 22 is moved to the right, the platform 20 and the alternate dual-rotation actuating means also is moved to the right. The roller 140 is spaced away from the link 142. The teeth rack 143 is disengaged with the output gear 41. However the mono-direction gear 30 is moved to engage with both the output gear 41 and the third gear 13. Therefore the driving rotation and force can be transmitted from the driving gear 10, through the reducing gear set (i.e. gears 11, 12 and pinions 111, 121), the third gear 13, mono-direction gear 30 to the output gear 41 and output spindle 40. This becomes the monodirection state.

Figure 3B:
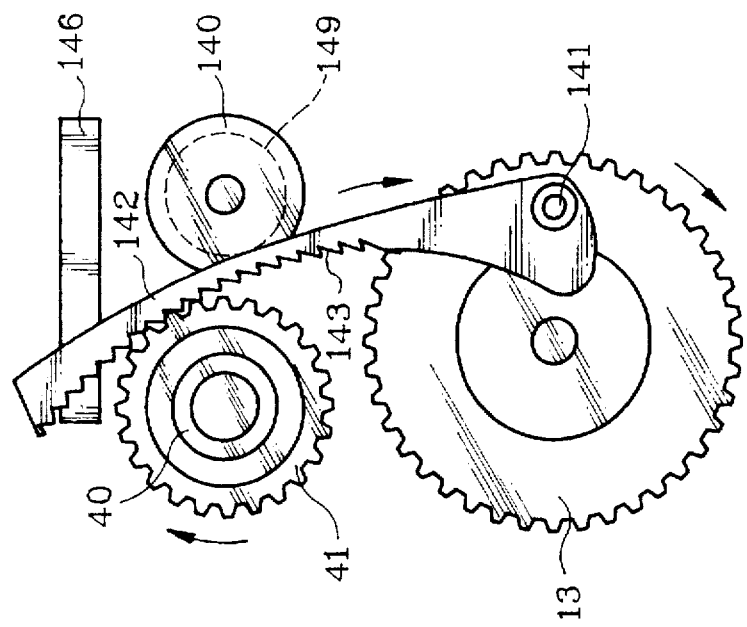
FIG. 3B is another fragmentary top view of this invention at a dual-direction rotation state in an alternate rotation direction of FIG. 3A.
Figure 3A:
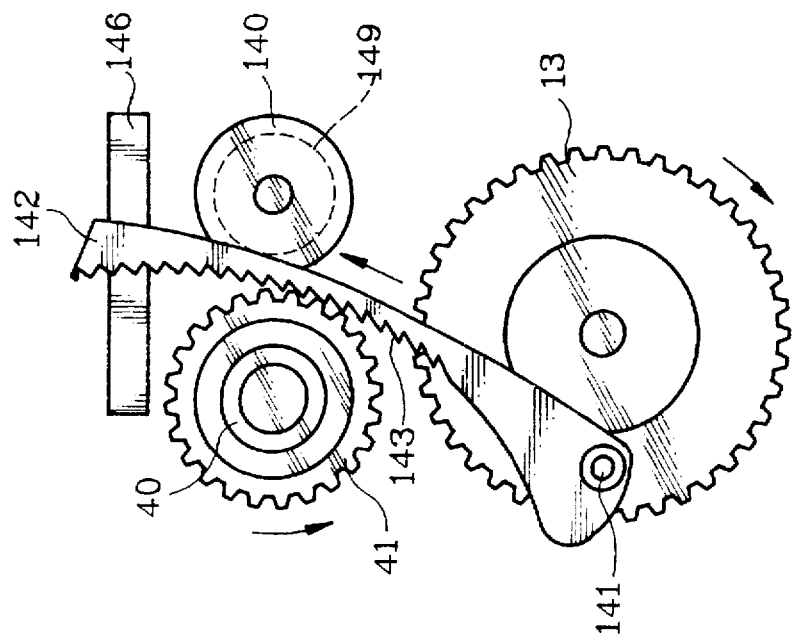
FIG. 3A is a fragmentary top view of this invention at a dual-direction rotation state.

When the handle 22 is moved to the left, the platform 20 and the alternate dual-rotation actuating means is also moved to the left. Mono-direction gear 30 is disengaged with the output gear 41. Roller 140, which has a portion 149 abutting link 142 pushes the link 142 to make contact with the output gear 41, and the compression spring 145 makes the teeth rack 143 engaging with the output-gear 41. When the driving gear 10 rotates, the rotation is transmitted via the reducing gear set to the third gear 13. Referring to FIG. 3A, when the pin 141 on the third gear 13 is moved to the left half side, the teeth rack 143 of the link 142 will move the output gear 41 to rotate in counter-clockwise direction. When the pin 141 is moved to the right half side (referring to FIG. 3B), the teeth rack 143 will move the output gear 40 to rotate in clockwise direction. Thus the output spindle 40 is at an alternate dual-direction state. Applying this invention set forth above, a decorative article or toy attached to the output spindle can be either rotated in one direction continuously (i.e. at mono-direction state) or can be rotated in dual directions alternately (at dual-direction state).

I claim:

1. An alternate mono-direction and dual-direction transmission apparatus, comprising:

a driving gear driven by an electric motor;

an output spindle having an output gear coaxially disposed thereon;

a reducing gear set including a plural number of gears and pinions for transmitting force and reducing rotation speed from the driving gear to the output gear;

a mono-direction gear engageable with the output gear;

a transversely slidable platform having an opening therein to permit the output spindle to pass therethrough, a vertical side wall, a vertical shaft for holding the mono-direction gear, and an alternate dual-rotation actuating means;

said alternate dual-rotation means including a third gear engaged with the reducing gear set, a link having a first end which is pivotally affixed to the third gear via a pin spaced apart from a center axis of the third gear and a second end which is slidable on the vertical side wall of the platform, and a roller held in a roller seat which is slidably contacted with a compression spring;

the link further having first and second sides, the first side of the link having a teeth rack which is engageable with the output gear and the second side of the link is in contact with the roller;

wherein, when the platform is moved transversely in one direction, the mono-direction gear engages with the third gear thus allowing the driving gear to transmit force in only one direction to the output spindle via the reducing gear set and the third gear, whereas, when the platform is moved transversely in an opposite direction, the mono-direction gear is disengaged from the output gear, and the teeth rack is engaged with the output gear through the roller and the compression spring thus enabling the output spindle to rotate alternately in both clockwise and counter-clockwise directions through the rotation of the pin on the third gear driven by the reducing gear set and driving gear.

2. An alternate mono-direction and dual-direction transmission apparatus of claim 1, wherein the third gear is mounted on a third gear seat and the third gear seat is in a transversely slidable position relative to the platform.

* * * * *